United States Patent [19]

Edwards et al.

[11] 4,150,014

[45] Apr. 17, 1979

[54] VULCANIZATES CONTAINING SILICEOUS FILLERS

[75] Inventors: Douglas C. Edwards; Kyosaku Sato, both of Sarnia, Canada

[73] Assignee: Polysar Limited, Sarnia, Canada

[21] Appl. No.: 884,206

[22] Filed: Mar. 7, 1978

[30] Foreign Application Priority Data

Apr. 14, 1977 [CA] Canada ................................... 276216

[51] Int. Cl.² ........................... C08K 3/34; C08K 3/36
[52] U.S. Cl. ................. 260/42.32; 260/23 H; 260/23 AR; 260/23.7 M; 260/23.7 H; 260/23.7 R; 260/23.7 B; 260/42.31; 260/42.33; 260/42.34; 260/42.35; 260/42.37; 260/42.39; 260/42.41; 260/42.57
[58] Field of Search .......... 260/23 H, 23 AR, 23.7 M, 260/23.7 H, 23.7 R, 23.7 B, 42.37, 42.31, 42.57, 42.32, 42.33, 42.34, 42.35, 42.39, 42.41

[56] References Cited

U.S. PATENT DOCUMENTS

| 2,980,644 | 4/1961 | Atkinson | 260/42.37 |
| 3,758,439 | 9/1973 | Fodor | 260/42.37 |

*Primary Examiner*—Melvyn I. Marquis
*Attorney, Agent, or Firm*—Stevens, Davis, Miller & Mosher

[57] ABSTRACT

There is provided a process, and the product of that process, for the production of improved silica or calcium silicate filled rubbery vulcanizates in which a polymer containing hydroxyl groups is mixed with silica or calcium silicate and an amine, the mixture is subjected to shearing at an elevated temperature and vulcanized to yield the improved vulcanizates. Such vulcanizates may be used in place of carbon black vulcanizates.

18 Claims, No Drawings

VULCANIZATES CONTAINING SILICEOUS FILLERS

This invention is directed to improved silica-filled or calcium silicate-filled rubbery vulcanizates. In particular, the polymer of the filled vulcanizate contains certain selected groups which are caused to interact with the silica or calcium silicate.

The effects due to the presence of fillers in polymer vulcanizates are well known. Comparison of a gum vulcanizate with a filled vulcanizate shows the improved strength and wear characteristics in the filled vulcanizate when the filler used belongs to the class known as reinforcing fillers. The types of fillers that may be compounded with polymers are quite diverse in nature, the selection of the type of filler being mainly dependent on the properties required of the vulcanizate derived therefrom, but are normally divided into reinforcing and non-reinforcing types. From the group of reinforcing fillers, two which have received the most attention are the various carbon blacks and silicas. Of these two types, carbon black is the most dominant because of price and the overall balance of vulcanizate properties.

There has existed a desire to improve the characteristics of silica-filled and silicate-filled vulcanizates and to make them more closely equivalent to carbon black filled vulcanizates. This desire arises partly from the fact that light colored vulcanizates, which obviously cannot contain carbon black, have a definite place in the market and partly from the fact that silica and silicates do not depend, in principle, upon the use of hydrocarbons for their manufacture. Any attempt to improve the properties of silica or silicate filled vulcanizates to more closely match the properties of carbon black filled vulcanizates is thus timely and would fill a need long recognized by the industry.

Vulcanizates obtained from silica or silicate filled polymers, while having certain useful properties, are known to be deficient due to being boardy, which may be described as a stiffness at low elongations and lack of resilience, and due to high tensile set, both of which deficiencies can be avoided in carbon black filled vulcanizates.

In attempts to overcome some of the deficiencies associated with the use of silica fillers in polymers, silica has been treated with a number of chemicals to modify the chemical nature of the surface of the silica particles. Thus, silica has been treated with diazomethane, with alcohols, and with a range of organo-silanes including, for example, trimethylchlorosilane. However, these treatments, while leading to minor improvements, were not successful in overcoming the overall deficiencies.

Other chemical compounds have been mixed with silica-polymer systems for a different reason. Silica, due to its highly absorbtive surface, tends to preferentially absorb the chemical curing agents normally used which leads to undercuring during the vulcanization step. In order to overcome this problem, certain chemicals such as glycols, e.g. diethylene glycol or poly(ethylene glycol), amines, e.g. triethanolamine and guanidines have been added during the compounding steps and allow the use of normal levels of curing agents to achieve the expected level of cure. The overall aforementioned deficiencies are still found in such vulcanizates.

None of these chemical treatments or chemical additives have overcome the deficiencies associated with the use of silica as filler in polymeric vulcanizates.

A more recent improvement in the art of using silica as a filler for polymers is the use of coupling agents. Significant improvements in the vulcanizate properties can be attained when coupling agents are added. The most effective coupling agents are organofunctional silanes; titanium-containing compounds are also known. Suitable organofunctional silanes include the mercaptosilanes. Vulcanizates containing mercaptosilanes added to the silica filler during the compounding stage generally show, in comparison with silica-filled vulcanizates not containing such silanes, increased values for modulus and tensile strength, and decreased elongation at break—generally, properties more comparable to the properties of carbon black filled vulcanizates. Although a number of coupling agents are commercially available, their cost is extremely high, making them not very practical for general use.

Thus, the problem still exists that silica-filled vulcanizates, of reasonable cost, cannot be produced to have acceptable strength, resilience and tensile set properties.

We have now discovered improved silica filled and silicate filled rubbery vulcanizates and processes of preparing such improved filled rubbery vulcanizates.

It is an objective of this invention to provide an improved silica filled or calcium silicate filled rubbery vulcanizate, wherein the vulcanizate exhibits improved physical properties including at least one of and preferably at least two of higher 300% modulus and tensile strength, lower Young's modulus, lower 25% modulus, lower tensile set, lower heat build-up and lower hardness.

It is a further objective of this invention to provide a process for the preparation of improved silica filled or calcium silicate filled rubbery vulcanizates, wherein the silica is mixed prior to the vulcanization step, with a rubbery polymer containing selected functional groups, said mixing being in the presence of a small amount of an additive as hereinafter defined and said mixing being at an elevated temperature and under shearing conditions.

In accordance with the invention, we have found a process for the production of improved silica or calcium silicate filled rubbery vulcanizates which comprises preparing a mixture comprising per 100 parts by weight of a vulcanizable hydrocarbyl polymer containing hydroxyl groups, from about 5 to about 100 parts by weight of silica or calcium silicate and from about 0.5 to about 5 parts by weight of an amine, subjecting said mixture to a treatment wherein it is sheared at an elevated temperature, cooling said mixture, incorporating into said mixture vulcanization active compounds and vulcanizing by heating at an elevated temperature to produce the improved silica or calcium silicate filled rubbery vulcanizate.

Further, in accordance with the invention, we have found a process for the production of improved silica or calcium silicate filled rubbery vulcanizates which comprises preparing a mixture comprising per 100 parts by weight of a vulcanizable hydrocarbyl polymer containing from about 1.5 to about 80 millimoles of hydroxyl groups per 100 grams of polymer, from about 5 to about 100 parts by weight of silica or calcium silicate and from about 0.5 to about 5 parts by weight of an amine selected from compounds of formula R—NH$_2$, R—NHR' and R—NR"R"' wherein R is a C$_4$-C$_{30}$ linear or branched alkyl or alkylene group which may contain up to three NH$_2$, NH or NR" groups or a C$_4$-C$_{30}$ cycloalkyl group or a C$_7$-C$_{20}$ alkaryl group connected to the nitrogen atom through the alkyl component of the alkaryl group, R' is a C$_1$-C$_{30}$ linear or branched alkyl or alkylene group and R" and R"', which may be the same or different, is a C$_1$-C$_{10}$ alkyl group, subjecting said mixture to a treatment wherein it is sheared at a temperature of from about 100° to about 175° C., cooling said mixture, incorporating into said mixture vulcanization active compounds and vulcanizing by heating at an elevated temperature to produce the improved silica or calcium silicate filled rubbery vulcanizate.

Still further in accordance with the invention, there is provided an improved silica or calcium silicate filled rubbery vulcanizate derived from the vulcanization of a mixture comprising per 100 parts by weight of vulcanizable hydrocarbyl polymer containing hydroxyl groups, from about 5 to about 100 parts by weight of silica or calcium silicate and from about 0.5 to about 5 parts by weight of an amine, said mixture having been subjected to shearing at an elevated temperature prior to incorporation of vulcanization active compounds and vulcanization.

Still further in accordance with the invention, there is provided an improved silica or calcium silicate filled rubbery vulcanizate derived from the vulcanization of a mixture comprising per 100 parts by weight of vulcanizable hydrocarbyl polymer containing from about 1.5 to about 80 millimoles of hydroxyl groups per 100 grams of polymer, from about 5 to about 100 parts by weight of silica or calcium silicate and from about 0.5 to about 5 parts by weight of an amine selected from compounds of formula R—NH$_2$, R—NHR' and R—NR"R"' wherein R is a C$_4$-C$_{30}$ linear or branched alkyl or alkylene group which may contain up to three NH$_2$, NH or NR' groups or a C$_4$-C$_{30}$ cycloalkyl group or a C$_7$-C$_{20}$ alkaryl group connected to the nitrogen atom through the alkyl component of the alkaryl group, R' is a C$_1$-C$_{30}$ linear or branched alkyl or alkylene group and R" and R"', which may be the same or different, is a C$_1$-C$_{10}$ alkyl group, said mixture having been subjected to shearing at a temperature of from about 100° C. to about 175° C. prior to incorporation of vulcanization active compounds and vulcanization.

In order to establish whether improved vulcanizate properties are achieved, it is necessary to be able to define these properties in measurable quantities. For vulcanizates of polymeric materials, the conventional type of stress-strain measurement supplies much useful information. Prior art silica-filled vulcanizates exhibit, in comparison with carbon black filled vulcanizates, a higher modulus at low degrees of extension (e.g. 25% strain) and a lower modulus at high degrees of extension (e.g. 300% strain). By means of slow rate extension tests, the modulus at 25% extension is readily determined. Further, the slope of the stress-strain curve at zero extension can also be determined; this is the Young's modulus. The Young's modulus and the 25% modulus illustrate the stiffness at low elongations. Stress-strain tests conducted at the conventional rates of extension provide the 100% modulus, the 300% modulus, the elongation at break and the tensile strength. On completion of a stress-strain test, the two ruptured pieces of the test specimen are, ten minutes after rupture, carefully fitted together so that they are in contact over the full area of the break—the distance between the two bench marks is measured. The tensile set is the extension remaining in the test piece and is expressed as a percentage of the original test piece length. Thus, test procedures are known whereby it is readily possible to quantify the quality of the vulcanizates.

The polymers which may be used in the present invention are vulcanizable hydrocarbyl polymers which contain functional groups attached to the polymer chain. The functional groups are hydroxyl and may be attached either directly to the polymer chain or may be attached to the polymer chain through a hydrocarbyl group. Suitable vulcanizable hydrocarbyl polymers are essentially C$_4$-C$_6$ conjugated diolefin polymers, polymers of C$_4$-C$_6$ conjugated diolefins and at least one other copolymerizable vinyl or vinylidene-containing monomer, polymers comprising a C$_4$-C$_6$ isoolefin and polymers comprising one or two alpha olefins. Examples of such suitable polymers include polybutadiene, polyisoprene, butadiene-styrene polymers, isoprene-styrene polymers, butadiene-acrylonitrile polymers, butadiene-methacrylonitrile polymers, isoprene-acrylonitrile polymers, isobutylene-isoprene polymers, ethylene-propylene polymers, ethylene-propylene-nonconjugated diolefin polymers and polyisoprene. All the polymers are solid high molecular weight materials, having Mooney viscosities within the range of about (ML 1+4 at 100° C.) 30 to about 150. The functional groups may be incorporated into the polymers by copolymerization of suitable monomers or by chemical modification of the polymer. Incorporation of the functional groups by copolymerization can only be achieved in an emulsion free radical polymerization system whereas incorporation of the functional groups by chemical modification can be achieved with polymers prepared by emulsion free radical polymerization and with polymers prepared by other methods of polymerization. One of average skill in the art will be able to readily relate monomers suitable for emulsion free radical polymerization. Suitable copolymerizable monomers include hydroxethyl methacrylate, hydroxyethyl acrylate, hydroxypropyl acrylate or methacrylate, hydroxypropyl crotonate, di(2-hydroxyethyl) maleate, di(2-hydroxyethyl) fumarate, N-ethanol acrylamide, hydroxyethyl vinyl ether and diethyleneglycol monovinyl ether. Suitable chemical modification may include partial epoxidation followed by reduction of carbon-carbon double bonds in a polymer containing unsaturation, treatment with an alkali metal alkyl compound such as butyl lithium followed by hydrolysis and hydrolysis of halogen groups in a polymer molecule. Thus the polymers which may be used in this invention are the vulcanizable hydrocarbyl polymers hereinbefore described and containing hydroxyl groups attached to the polymer chain.

The concentration of the bound functional groups in the polymer will be from about 1.5 millimoles per 100 grams of polymer to about 80 millimoles per 100 grams of polymer. Preferably, the concentration of the bound functional groups is from about 2 to about 60 millimoles per 100 grams of polymer. Suitable concentration of the functional groups can also be achieved by mixing a polymer having a concentration of bound functional groups of from about 20 to about 80 millimoles per 100 grams of polymer with a like polymer having no functional groups, the two polymers being mixed in such a ratio that the concentration in the mixture of functional groups is from about 4 to about 60 millimoles of functional groups per 100 grams of the mixture of polymers.

The silica which is mixed with the polymer to produce the compounds and vulcanizates of this invention is of fine particle size, that is to say generally less than about 0.1 micron but larger than about 0.01 microns average particle size. Such silicas are well known in the art and may be selected from the fumed silicas, which are relatively anhydrous, and from the precipitated silicas, which contain water of hydration. The calcium silicate is a precipitated calcium silicate containing water of hydration and having an average particle size of less than 0.1 micron but greater than 0.01 micron. Preferably, the silica has an average particle size of 0.015 to 0.05 microns and is a precipitated silica. Preferably, the calcium silicate has an average particle size of 0.015 to 0.05 microns.

The amount of silica or calcium silicate which may be mixed with the polymer is from about 5 parts to about 100 parts by weight per 100 parts by weight of polymer. In normal practice, the higher concentration of silica or silicate, that is, from about 60 to about 100 parts by weight per 100 parts by weight of polymer, will be mixed with polymers which may contain hydrocarbon oil or hydrocarbyl plasticizer or to which hydrocarbon oil or hydrocarbyl plasticizer is added during the compounding stage. Additional fillers may also be added to the silica-polymer mixture, such additional fillers being selected from the generally non-reinforcing or semi-reinforcing fillers such as calcium carbonate, titanium dioxide, calcium sulphate, clays and silicates and from the carbon blacks. Such additional fillers may be present in amounts from about 5 to about 150, preferably from about 5 to about 80 parts by weight per 100 parts by weight of polymer. Carbon black may also be present at up to about 3 parts by weight per 100 parts by weight of polymer as a coloring agent.

The additive which is also added to the silica or calcium silicate polymer mixture is a material which appears to promote a reaction between the functional groups of the polymer and the silica or silicate surface. The exact nature of the role played by this additive is uncertain at this time but it is known that the presence of such a material in the silica or calcium silicate polymer mixture during the heating and shearing action leads to improved properties of the vulcanizates. The additive is an amine selected from compounds of formula

R—NH$_2$, R—NHR' and R—NR"R'"

wherein R is a C$_4$-C$_{30}$ linear or branched alkyl or alkylene group which may contain up to three NH$_2$, NH or NR" groups or a C$_4$-C$_{30}$ cycloalkyl group or a C$_7$-C$_{20}$ alkaryl group connected to the nitrogen atom through the alkyl component of the alkaryl group, R' is a C$_1$-C$_{30}$ linear or branched alkyl or alkylene group and R" and R''', which may be the same or different, is a C$_1$-C$_{10}$ alkyl group.

Typical examples of suitable amines include hexylamine, decylamine, octadecylamine, 1,1-dimethyl decylamine, 1,1-diethyl octadecylamine, octadecylene amine, N,N-dimethyl decylamine, N,N-diethyl octadecylamine, di(dodecyl)amine, hexamethylene diamine, triethylene tetramine and N,N,N',N' tetramethyl hexamethylene diamine.

Preferred amines include the compounds of formula R—NH$_2$ and R—NHR', wherein R is a C$_{10}$-C$_{20}$ linear or branched alkyl or alkylene group which may contain 1 NH$_2$ or NH group and R' is a C$_{10}$-C$_{20}$ linear or branched alkyl or alkylene group. Most preferred amines are compounds of formula R—NH$_2$ wherein R is a C$_{10}$-C$_{20}$ linear or branched alkyl or alkylene group.

The quantity of the additive added to the silica or calcium silicate polymer mixture is from about 0.5 to about 5 parts by weight of additive per 100 parts by weight of polymer. Preferably the quantity of the additive added is from about 1 to about 3 parts by weight of additive per 100 parts by weight of polymer. The additive may be added to the silica or calcium silicate polymer mixture either during the initial mixing of the silica or silicate and polymer, it may be added in a subsequent mixing operation or it may be have been added previously to the silica or silicate.

It is necessary that the silica or calcium silicate polymer mixture be subjected to a treatment wherein it is sheared at an elevated temperature in the presence of the additive. Such shearing may be achieved on a two roll rubber mill or in an internal mixer and may be during the mixing of the polymer and filler or as a subsequent step to such mixing. The elevated temperature is from about 100° to about 175° C., preferably from about 120° to about 160° C. The mixture is subjected to such treatment for a time of from about 0.25 to about 10 minutes, preferably from about 0.5 to about 5 minutes. For ease of operation, it is preferred to add the additive during the initial mixing of the silica or silicate and polymer.

The mixing of the silica or calcium silicate and polymer may be achieved using conventional rubber mixing equipment including two roll rubber mills and internal mixers. The subsequent addition, after cooling from the shearing at elevated temperature, of other compounding ingredients and vulcanization active compounds is by means conventional in the rubber industry including, especially when vulcanization active compounds are involved, two roll rubber mills operated at relatively low temperatures, usually below about 65° C. Suitable vulcanization systems are chosen to match the nature of the polymer and the intended use for the vulcanizate and are well known in the industry. The nature of the vulcanization system is not critical to this invention. The compounds are vulcanized by heating at an elevated temperature, for example at temperatures of 125°–200° C. for times of from 1 minutes to 10 hours, preferably at temperatures of 150°–170° C. for from 3 to 60 minutes.

The vulcanizates produced from the silica or calcium silicate polymer mixtures of this invention possess significantly improved physical properties when compared with comparable prior art vulanizates except those containing an organofunctional coupling agent. Comparison of the vulcanizates of this invention when they contain 50 parts by weight of silica per 100 parts by weight of polymer with prior art vulcanizates also containing 50 parts of silica, shows that the vulcanizates of the present invention have at least one of and preferably at least two of the following properties: a reduced Young's modulus, a reduced modulus at 25% extension, an increased modulus at 300% extension, an increased tensile strength and a reduction in the tensile set. Preferably, the vulcanizates of this invention will have a reduced Young's modulus and a reduced 25% modulus and most preferably the vulcanizates will have a reduced Young's modulus, a reduced 25% modulus, an increased 300% modulus and a reduced tensile set.

The following examples are provided to illustrate, but not limit, the invention and all parts are parts by weight unless otherwise stated.

EXAMPLE 1

A polymer of butadiene, acrylonitrile and hydroxyethylene methacrylate was prepared, by conventional emulsion polymerization techniques at a temperature of 13° C. The polymer contained about 34 weight percent of acrylonitrile and about 1 weight percent of hydroxyethyl methacrylate.

A butadiene-acrylonitrile polymer containing about 34 weight percent of acrylonitrile was prepared by an identical procedure for use as a control polymer.

Samples of these polymers (100 parts by weight) were mixed on a rubber mill, Experiments 1A and 2A, with 50 parts by weight of silica (HiSil 233 TM) and 1.5 parts by weight of dodecylamine following which they were milled for three minutes with the mill rolls maintained at 150° C., or with 60 parts by weight of calcium silicate (Silene EF TM), Experiment 1B, and 1.5 parts by weight of Armeen T TM and milled for 3 minutes at 150° C., Experiment 2B. The compounded polymer was removed and cooled. When cold, the compounded polymer was returned to a rubber mill at room temperature and dicumyl peroxide (DiCup 40C TM in the amount shown in Table I) was added and thoroughly mixed in. The compounded polymer was sheeted off, put into a mold and vulcanized in a press at 160° C. for 30 minutes. Specimens were cut off from the vulcanizates so produced and tested. The results are given in Table I. The data clearly show that the vulcanizates of this invention exhibit significantly improved properties, including an improved tensile strength and 300% modulus, and a reduced Young's modulus and tensile set.

TABLE I

| Experiment No. | 1 | | 2 | |
|---|---|---|---|---|
| Polymer | Butadiene-acrylonitrile (Control) | | Butadiene-acrylonitrile-hydroxyethyl metahcrylate | |
| | A | B | A | B |
| Wt. % HEMA in polymer | 0 | 0 | 1 | 1 |
| Wt. % dicumyl peroxide (based on polymer) | 3.5 | 4.0 | 3.0 | 4.0 |
| Vulcanizate properties | | | | |
| Tensile strength kg/cm$^2$ | 266 | 141 | 318 | 173 |
| Elongation % | 520 | 440 | 550 | 370 |
| 100% Modulus kg/cm$^2$ | 27 | 32 | 26 | 33 |
| 300% Modulus kg/cm | 98 | 81 | 135 | 140 |
| 25% Modulus kg/cm | 10 | 12 | 5 | 10 |
| Young's Modulus kg/cm$^2$ | 159 | 139 | 51 | 60 |
| Tensile set % | 15 | 10 | 10 | 5 |
| Hardness Shore A$_2$ | 80 | 76 | 70 | 70 |

EXAMPLE 2

Polymers of butadiene, acrylonitrile and hydroxyethyl methacrylate were prepared as in Example 1 except that the quantities of butadiene and hydroxyethyl methacrylate (HEMA) were adjusted so that the total was always about 66 weight percent of the polymer and the quantity of bound HEMA was varied from 0.25 to 5 weight percent of the polymer. The amount of bound HEMA is shown in Table II. The compounding and hot milling procedures of Example 1 were followed, the compounded polymers were vulcanized by heating at 160° C. for 30 minutes and the vulcanizates tested.

The results are given in Table II and show that the vulcanizates exhibit improved properties even when the HEMA level is as low as 0.25 weight percent of the polymer.

TABLE II

| Experiment No. | 10 | 11 | 12 | 13 | 14 | 15 |
|---|---|---|---|---|---|---|
| Wt. % HEMA in polymer | 0.25 | 0.5 | 1.0 | 1.5 | 2.0 | 5.0 |
| Wt. % dicumyl peroxide (based on polymer) | 1.5 | 2.0 | 2.0 | 2.5 | 1.5 | 1.0 |
| Vulcanizate properties | | | | | | |
| Tensile strength kg/cm$^2$ | 242 | 299 | 320 | 283 | 316 | 235 |
| Elongation % | 360 | 410 | 380 | 420 | 410 | 390 |
| 100% Modulus kg/cm$^2$ | 75 | 35 | 49 | 35 | 30 | 26 |
| 300% Modulus kg/cm$^2$ | 196 | 199 | 239 | 181 | 209 | 160 |
| 25% Modulus kg/cm$^2$ | 10 | 9 | 9 | 9 | 7 | 5 |
| Young's Modulus kg/cm$^2$ | 73 | 63 | 51 | 57 | 42 | 29 |
| Tensile set % | 5 | 5 | 5 | 6 | 6 | 5 |
| Hardness Shore A$_2$ | 84 | 77 | 75 | 77 | 77 | 76 |

EXAMPLE 3

Using a polymer of similar composition to that of Example 1, Experiment No. 2, containing 1 weight percent of hydroxyethyl methacrylate, the effect was studied of a variety of amines, in place of the octadecylamine of Experiment No. 2A of Example 1. The specific amines were all added in an amount of 1.5 parts by weight per 100 parts by weight of the polymer. The dicumyl peroxide used was DiCup 40C. The hot milling was 3 minutes at 150° C. Vulcanization was for 30 minutes at 160° C.

The results are shown in Table III from which it is clear that primary, secondary and tertiary amines are effective additives in the process of this invention.

TABLE III

| Experiment No. | 20 | 21 | 22 | 23 | 24 | 25 | 26 |
|---|---|---|---|---|---|---|---|
| | | | N,N-Dimethyl | | | Duomeen 5* | Hexa- |

TABLE III-continued

| Amine Type | Hexadecyl amine | Octadecyl amine | octadecyl amine | Armeen T* ($C_{18}H_{35}NH_2$) | Di(dodecyl) amine | $RNH$<br>$\|$<br>$(CH_2)_2 \cdot NH_2$ | methylene diamine |
|---|---|---|---|---|---|---|---|
| Wt. % of dicumyl peroxide (based on polymer) | 4.0 | 4.0 | 4.0 | 4.0 | 3.5 | 3.5 | 3.5 |
| Vulcanizate properties | | | | | | | |
| Tensile strength kg/cm$^2$ | 260 | 250 | 260 | 261 | 324 | 298 | 285 |
| Elongation % | 430 | 400 | 470 | 400 | 510 | 440 | 440 |
| 100% Modulus kg/cm$^2$ | 30 | 30 | 28 | 30 | 26 | 28 | 33 |
| 300% Modulus kg/cm$^2$ | 167 | 163 | 131 | 161 | 155 | 179 | 179 |
| 25% Modulus kg/cm$^2$ | 9 | 9 | 9 | 7 | 8 | 8 | 10 |
| Young's Modulus kg/cm$^2$ | 56 | 61 | 79 | 46 | 49 | 51 | 72 |
| Tensile set % | 5 | 5 | 8 | 4 | 7 | 5 | 10 |
| Hardness Shore A$_2$ | 79 | 79 | 79 | 75 | 76 | 76 | 77 |

*Registered Trade Marks

| Experiment No. | 27 | 28 | 29 |
|---|---|---|---|
| Amine Type | Tri-octyl amine | Tri-isooctyl amine | Benzyl amine |
| Wt. % of dicumyl peroxide | 4.0 | 4.0 | 4.0 |
| Vulcanizate properties | | | |
| Tensile strength kg/cm$^2$ | 246 | 270 | 283 |
| Elongation % | 360 | 410 | 440 |
| 100% Modulus kg/cm$^2$ | 35 | 35 | 30 |
| 300% Modulus kg/cm$^2$ | 180 | 188 | 180 |
| 25% Modulus kg/cm$^2$ | 9 | 9 | 9 |
| Young's Modulus kg/cm$^2$ | 65 | 67 | 53 |
| Tensile set % | 3 | 3 | 3 |
| Hardness Shore A$_2$ | 80 | 80 | 77 |

EXAMPLE 4

A polymer of similar composition to that of Example 1 and containing 1 weight percent of hydroxyethyl methacrylate was compounded, subjected to heat treatment, vulcanized and the vulcanizate properties were determined, as in Example 1, the difference being that the conditions of temperature and time for the heat treatment were varied as shown in Table IV. The amine used was dodecylamine the quantity being 1.5 weight percent based on polymer and the amount of dicumyl peroxide was 3.5 weight percent based on polymer, DiCup TM 40C being used. For Experiment No. 35, 100 parts of the polymer was mixed in a Brabender TM Plasticorder equipped with a Banbury TM mixing head with 50 parts of silica, 10 parts of dioctyl phthalate and 1.5 parts of Armeen T TM. The mixer was initially at a temperature of about 90° C. and the mixing was continued for 8 minutes without control of the temperature which had risen to 139° C. at the end of the 8 minutes. After cooling, the mixture was compounded on a cold mill with 4 parts of DiCup TM 40C and vulcanized.

The results shown in Table IV clearly demonstrate the need for heating under shearing conditions in order to obtain the improved vulcanizate properties.

TABLE IV

| Experiment No. | 30 | 31 | 32 | 33 | 34 | 35 |
|---|---|---|---|---|---|---|
| Temperature of heat treatment ° C. (approx.) | 30 | 100 | 125 | 150 | 150 | 90–139 |
| Time of heat treatment min. | Nil | 3 | 3 | 1 | 3 | * |
| Vulcanizate properties | | | | | | |
| Tensile strength kg/cm$^2$ | 272 | 291 | 267 | 260 | 275 | 239 |
| Elongation % | 620 | 520 | 520 | 510 | 530 | 670 |
| 100% Modulus kg/cm$^2$ | 24 | 26 | 26 | 26 | 26 | 19 |
| 300% Modulus kg/cm$^2$ | 70 | 90 | 110 | 109 | 108 | 70 |
| 25% Modulus kg/cm$^2$ | 11 | 9 | 8 | 8 | 7 | 8 |
| Young's Modulus kg/cm$^2$ | 188 | 96 | 55 | 68 | 45 | 76 |
| Tensile set % | 15 | 10 | 7 | 7 | 9 | 14 |
| Hardness Shore A$_2$ | 80 | 75 | 73 | 74 | 74 | 74 |

*Heat treatment - static, in a press

EXAMPLE 5

A polymer containing 1 weight percent of hydroxyethyl methacrylate and similar to that of Example 1 was compounded with a fumed silica instead of the hydrated silica of Example 1. All other conditions were the same as for Example 1, the level of dicumyl peroxide being 4 weight percent based on polymer. A control experiment was also made in which no dodecylamine was added prior to the heat treating step.

The vulcanizate properties are shown in Table V, from which it is clear that improved vulcanizate properties are achieved when using fumed silica.

TABLE V

| Experiment No. | 40 | 41 |
|---|---|---|
| | (Control, no amine) | |
| Tensile strength kg/cm$^2$ | 320 | 342 |
| Elongation % | 330 | 490 |
| 100% Modulus kg/cm$^2$ | 36 | 30 |
| 300% Modulus kg/cm$^2$ | 271 | 141 |
| 25% Modulus kg/cm$^2$ | 20 | 12 |
| Young's Modulus kg/cm$^2$ | 274 | 110 |
| Tensile set % | 6 | 9 |
| Hardness Shore A$_2$ | 87 | 81 |

EXAMPLE 6

Using a polymer of similar composition to that of Example 1, Experiment No. 2, and containing 1 weight percent of hydroxyethyl methacrylate, the effect was studied of varying the level of Armeen T, expressed as weight percent based on polymer, present during the heat treatment step. For experiment No. 56, the polymer contained 1 weight percent of hydroxyethyl acrylate instead of hydroxyethyl methacrylate. The quantity of DiCup 40C added was 4 weight percent based on polymer and vulcanization was for 30 minutes at 160° C. For the control experiment, Experiment No. 50, no amine was present during the heat treatment step.

The results shown in Table VI clearly demonstrate that even 0.5 weight percent of Armeen T leads to a significant improvement in the vulcanizate properties.

TABLE VI

| Experiment No. | 50 | 51 | 52 | 53 | 54 | 55 | 56 |
|---|---|---|---|---|---|---|---|
| Quantity of Armeen T | 0 | 0.5 | 1.0 | 1.5 | 2.0 | 3.0 | 1.5 |
| Vulcanizate properties | | | | | | | |
| Tensile strength kg/cm$^2$ | 297 | 344 | 325 | 323 | 321 | 301 | 282 |
| Elongation % | 440 | 380 | 350 | 330 | 370 | 370 | 340 |
| 100% Modulus kg/cm$^2$ | 33 | 44 | 34 | 43 | 35 | 30 | 33 |
| 300% Modulus kg/cm$^2$ | 171 | 255 | 270 | 280 | 250 | 230 | 223 |
| 25% Modulus kg/cm$^2$ | 10 | 9 | 8 | 9 | 8 | 8 | 9 |
| Young's Modulus kg/cm$^2$ | 104 | 62 | 52 | 61 | 56 | 52 | 66 |
| Tensile set % | 6 | 6 | 2 | 4 | 4 | 4 | 4 |
| Hardness Shore A$_2$ | 79 | 74 | 73 | 73 | 71 | 71 | 74 |

EXAMPLE 7

Using a conventional emulsion free radical polymerization procedure, a polymer was prepared which contained about 34 weight percent of acrylonitrile, about 61 weight percent of butadiene and 5 weight percent of hydroxyethyl methacrylate. A commercially available acrylonitrile-butadiene polymer containing 34 weight percent of acrylonitrile and having a Mooney (ML 1+4 at 100° C.) of 50 was also used. Blends were prepared of the acrylonitrile-butadiene polymer and the acrylonitrile-butadiene-hydroxyethyl methacrylate polymer in the ratios shown in Table VII, and the blended polymers were mixed with 50 parts by weight per 100 parts by weight of polymer of silica and 1.5 parts by weight per 100 parts by weight of polymer of dodecylamine and heat treated at 150° C. for 3 minutes, as in Example 1. Dicumyl peroxide (DiCup 40C) was added to the compounds which were vulcanized by heating at 160° C. for 30 minutes.

The properties of the vulcanizates are shown in Table VII from which it is clear that blends containing as little as the equivalent of 0.25 weight percent of hydroxyethyl methacrylate exhibit improved properties, and blends containing from the equivalent of 0.5 weight percent of hydroxyethyl methacrylate exhibit much improved properties.

TABLE VII

| Experiment No. | 60 | 61 | 62 | 63 | 64 | 65 |
|---|---|---|---|---|---|---|
| Acrylonitrile-butadiene polymer - wt. | 100 | 95 | 90 | 80 | 60 | 0 |
| Acrylonitrile-butadiene hydroxyethyl methacrylate polymer weight | 0 | 5 | 10 | 20 | 40 | 100 |
| Equivalent HEMA content in blend - weight | 0 | 0.25 | 0.5 | 1 | 2 | 5 |
| Dicumyl peroxide - wt. % based on polymer | 5.0 | 4.0 | 4.0 | 4.0 | 3.5 | 1.0 |
| Vulcanizate properties | | | | | | |
| Tensile strength kg/cm$^2$ | 225 | 235 | 242 | 275 | 255 | 235 |
| Elongation % | 400 | 440 | 370 | 390 | 300 | 390 |
| 100% Modulus kg/cm$^2$ | 35 | 29 | 35 | 35 | 28 | 26 |
| 300% Modulus kg/cm$^2$ | 136 | 123 | 171 | 189 | 255 | 160 |
| 25% Modulus kg/cm$^2$ | 12 | 12 | 11 | 10 | 9 | 5 |

TABLE VII-continued

| Experiment No. | 60 | 61 | 62 | 63 | 64 | 65 |
|---|---|---|---|---|---|---|
| Young's Modulus kg/cm$^2$ | 184 | 172 | 96 | 72 | 46 | 29 |
| Tensile set % | 10 | 10 | 6 | 5 | 3 | 5 |
| Hardness Shore A$_2$ | 80 | 78 | 80 | 80 | 76 | 76 |

EXAMPLE 8

The effect was studied of a sulphur cure, in place of a peroxide cure, on silica-reinforced polymers. As a control, a commercially available butadiene-acrylonitrile polymer was used which contained 34 weight percent of acrylonitrile and had a Mooney (ML 1+4 at 100° C.) of 50. A butadiene-acrylonitrile-hydroxyethyl methacrylate polymer and containing 1 weight percent of hydroxy-ethyl methacrylate was used to illustrate the present invention. The amine added was Armeen T, 1.5 weight percent based on the polymer and the heat treatment was on a rubber mill at 150° C. for 3 minutes. Following the heat treatment, the compound was allowed to cool to ambient temperature and the remaining ingredients were added on a mill maintained at 35°-40° C. The vulcanizate properties are shown in Table VIII, from which it can be seen that the vulcanizates according to this invention show significantly improved properties. The Table also shows that the scorch time can be affected by the incorporation of known scorch retarders (salicyclic acid), as for Example Experiment No. 72.

TABLE VIII

| Experiment No. | 70 | 71 | 72 |
|---|---|---|---|
| Butadiene-acrylonitrile polymer - weight | 100 | — | — |
| Butadiene-acrylonitrile-hydroxy-ethyl methacrylate polymer - weight | — | 100 | 100 |
| Silica - weight | 60 | 60 | 60 |
| Di-octyl phthalate - weight | 12.5 | 12.5 | 12.5 |
| Armeen T - weight | 1.5 | 1.5 | 1.5 |
| Mill at 150° C. for 3 minutes | | | |
| Zinc oxide - weight | 5 | 5 | 5 |
| Stearic acid - weight | 1.5 | 1.5 | 1.5 |
| Benzothiazyl disulphide - weight | 1.5 | 1.5 | 1.5 |
| Tetramethyl thiuram disulphide - weight | 0.5 | 0.5 | 0.5 |
| Spider Brand Sulphur - weight | 1.75 | 1.75 | 1.75 |
| Salicylic acid - weight | — | — | 1.0 |
| Scorch time (t$_5$ at 125° C.) min. | — | 6.5 | 20 |
| Cure at 166° C. for min. | 5 | 15 | 15 |
| Vulcanizate Properties | | | |
| Tensile Strength kg/cm$^2$ | 250 | 273 | 273 |
| Elongation % | 700 | 580 | 560 |
| 100% Modulus kg/cm$^2$ | 14 | 15 | 17 |
| 300% Modulus kg/cm$^2$ | 50 | 89 | 98 |
| 25% Modulus kg/cm$^2$ | 9 | 7 | 7 |
| Young's Modulus kg/cm$^2$ | 118 | 65 | 76 |
| Tensile set % | 26 | 13 | 13 |
| Hardness Shore A$_2$ | 78 | 75 | 75 |

EXAMPLE 9

A styrene-butadiene-hydroxyethyl methacrylate polymer containing approximately 0.5 weight percent of hydroxyethyl methacrylate and 23 weight percent of styrene was mixed with 50 weight percent of silica and 1.5 weight percent of Armeen T and hot milled at 150° C. for 3 minutes, as in Example 1. One control experiment was run in which no Armeen T was present. A second control experiment was run in which no amine was present and the hot milling was omitted.

The compounds so prepared were mixed at room temperature with the quantity of DiCup 40C shown in Table IX and then vulcanized for 30 minutes at 160° C.

The physical properties of the vulcanizates are shown in Table IX from which it is clear that the vulcanizate prepared according to the present invention has improved properties.

TABLE IX

| Experiment No. | 80 | 81 | 82 |
|---|---|---|---|
| Hot mill | Yes | Yes | No |
| Amine present | Yes | No | No |
| Dicumyl peroxide - wt. % based on polymer | 1.0 | 0.67 | 0.67 |
| Vulcanizate properties | | | |
| Tensile strength kg/cm$^2$ | 245 | 191 | 240 |
| Elongation % | 500 | 530 | 540 |
| 100% Modulus kg/cm$^2$ | 24 | 15 | 28 |
| 300% Modulus kg/cm$^2$ | 128 | 80 | 123 |
| 25% Modulus kg/cm$^2$ | 7 | 7 | 10 |
| Young's Modulus kg/cm$^2$ | 64 | 91 | 110 |
| Tensile set % | 5 | 9 | 14 |
| Hardness Shore A$_2$ | 75 | 72 | 79 |

What is claimed is:

1. A process for the production of improved silica or calcium silicate filled rubbery vulcanizates which comprises preparing a mixture comprising 100 parts by weight of a vulcanizable hydrocarbyl polymer containing from about 1.5 to about 80 millimoles of hydroxyl groups per 100 grams of polymer, from about 5 to about 100 parts by weight of silica or calcium silicate, and from about 0.5 to about 5 parts by weight of an amine, subjecting said mixture to a treatment wherein it is sheared at a temperature of from about 100° to about 175° C., cooling said mixture, incorporating into said mixture vulcanization active compounds and vulcanizing by heating at an elevated temperature to produce the improved silica or calcium silicate filled rubbery vulcanizate, said amine being selected from compounds of formula

R—NH$_2$, R—NHR' and R—NR"R'"

wherein R is a C$_4$-C$_{30}$ linear or branched alkyl or alkylene group which may contain up to three NH$_2$, NH or NR" groups or is a C$_4$-C$_{30}$ cycloalkyl group or a C$_7$-C$_{20}$ alkaryl group connected to the nitrogen atom through the alkyl component of the alkaryl group, R' is a C$_4$-C$_{30}$ linear or branched alkyl or alkylene group and R" and R'", which may be the same or different, is a C$_1$-C$_{10}$ alkyl group.

2. The process of claim 1 wherein the silica or calcium silicate has an average particle size of from about 0.01 to about 0.1 microns.

3. The process of claim 1 wherein the mixture is sheared for a time of from about 0.25 to about 10 minutes.

4. The process of claim 1 wherein the vulcanizable hydrocarbyl polymer containing hydroxyl groups is selected from essentially C$_4$-C$_6$ conjugated diolefin polymers, butadiene-styrene polymers, isoprene-styrene polymers, butadiene-acrylonitrile polymers, butadiene-methacrylonitrile polymers, isoprene-acrylonitrile polymers, polymers comprising a $C_4$-$C_6$ isoolefin and polymers comprising one or two alpha olefins.

5. The process of claim 4 wherein the vulcanizable hydrocarbyl polymer containing hydroxyl groups is selected from polybutadiene containing hydroxyl groups, butadiene-styrene polymers containing hydroxyl groups, butadiene-acrylonitrile polymers containing hydroxyl groups, isoprene-acrylonitrile polymers containing hydroxyl groups and butadiene-methacrylonitrile polymers containing hydroxyl groups.

6. The process of claim 1 wherein the shearing is on a rubber mill or in an internal mixer.

7. The process of claim 5 wherein the amine is selected from compounds of formula R—$NH_2$ and R—NHR' where R is a $C_{10}$-$C_{20}$ linear or branched alkyl or alkylene group which may contain one $NH_2$ or NH group and R' is a $C_{10}$-$C_{20}$ linear or branched alkyl or alkylene group.

8. An improved silica or calcium silicate filled rubbery vulcanizate derived from the vulcanization of a mixture comprising 100 parts by weight of a vulcanizable hydrocarbyl polymer containing from about 1.5 to about 80 millimoles of hydroxyl groups per 100 grams of polymer, from about 5 to about 100 parts by weight of silica or calcium silicate, and from about 0.5 to about 5 parts by weight of an amine, said mixture having been subjected to shearing at a temperature of about 100° to about 175° C. prior to incorporation of vulcanization active compounds and vulcanization, said amine being selected from compounds of formula

wherein R is a $C_4$-$C_{30}$ linear or branched alkyl or alkylene group which may contain up to three $NH_2$, NH or NR" groups or is a $C_4$-$C_{30}$ cycloalkyl group or a $C_7$-$C_{20}$ alkaryl group connected to the nitrogen atom through the alkyl component of the alkaryl group, R' is a $C_4$-$C_{30}$ linear or branched alkyl or alkylene group and R" and R‴, which may be the same or different, is a $C_1$-$C_{10}$ alkyl group.

9. The rubbery vulcanizate of claim 8 wherein the silica or calcium silicate has an average particle size of from about 0.01 to about 0.1 microns.

10. The rubbery vulcanizate of claim 8 wherein the shearing is for a time of from about 0.25 to about 10 minutes.

11. The rubbery vulcanizate of claim 8 in which the vulcanizable hydrocarbyl polymer containing hydroxyl groups is selected from essentially $C_4$-$C_6$ conjugated diolefin polymers, butadiene-styrene polymers, isoprene-styrene polymers, butadiene-acrylonitrile polymers, butadiene-methacrylonitrile polymers, isoprene-acrylonitrile polymers, polymers comprising a $C_4$-$C_6$ isoolefin and polymers comprising one or two alpha olefins.

12. The rubbery vulcanizate of claim 11 in which the vulcanizable hydrocarbyl polymer containing hydroxyl groups is selected from butadiene-styrene polymers containing hydroxyl groups, butadiene-acrylonitrile polymers containing hydroxyl groups, isoprene-acrylonitrile polymers containing hydroxyl groups and butadiene-methacrylonitrile polymers containing hydroxyl groups.

13. The rubbery vulcanizate of claim 12 wherein the hydroxyl groups have been incorporated into the polymer by emulsion free radical copolymerization with a monomer selected from hydroxyethyl acrylate, hydroxyethyl methacrylate, hydroxypropyl acrylate, hydroxypropyl methacrylate, hydroxypropyl crotonate, di-(2-hydroxyethyl) maleate, di-(2-hydroxyethyl) fumarate, N-ethanol acrylamide, hydroxyethyl vinyl ether and di-ethylene glycol monovinyl ether.

14. The rubbery vulcanizate of claim 11 in which the vulcanizable hydrocarbyl polymer containing hydroxyl groups is selected from polybutadiene containing hydroxyl groups, isobutylene-isoprene polymers containing hydroxyl groups, chlorinated or brominated isobutylene-isoprene polymers containing hydroxyl groups, ethylene-propylene polymers containing hydroxyl groups and ethylene-propylene-non-conjugated diolefin polymers containing hydroxyl groups.

15. The rubbery vulcanizate of claim 8 in which the polymer is a butadiene-acrylonitrile polymer containing a copolymerized monomer selected from hydroxyethyl or hydroxypropyl acrylate or methacrylate, the amine is selected from compounds of formula R—$NH_2$ and R—NHR' where R is a $C_{10}$-$C_{20}$ linear or branched alkyl or alkylene group which may contain one $NH_2$ or NH group and R' is a $C_{10}$-$C_{20}$ linear or branched alkyl or alkylene group, and the silica or calcium silicate has an average particle size of from about 0.01 to about 0.1 microns, and the vulcanizate optionally contains from about 5 to about 150 parts by weight, per 100 parts by weight of polymer, of additional filler.

16. The rubbery vulcanizate of claim 8 in which the polymer is a butadiene-styrene polymer containing a copolymerized monomer selected from hydroxyethyl or hydroxypropyl acrylate or methacrylate, the amine is selected from compounds of formula R—$NH_2$ and R—NHR', where R is a $C_{10}$-$C_{20}$ linear or branched alkyl or alkylene group which may contain one $NH_2$ or NH group and R' is a $C_{10}$-$C_{20}$ linear or branched alkyl or alkylene group, and the silica or calcium silicate has an average particle size of from about 0.01 to about 0.1 microns, and the vulcanizate optionally contains from about 5 to about 150 parts by weight, per 100 parts by weight of polymer, of additional filler.

17. The rubbery vulcanizate of claim 16 in which the polymer is mixed with a butadiene-styrene polymer containing no hydroxyl groups in such a proportion that the concentration of hydroxyl groups is from about 4 to about 60 millimoles per 100 grams of the mixture of polymers.

18. The rubbery vulcanizate of claim 15 in which the polymer is mixed with a butadiene-acrylonitrile polymer containing no hydroxyl groups in such a proportion that the concentration of hydroxyl groups is from about 4 to about 60 millimoles per 100 grams of the mixture of polymers.

* * * * *